United States Patent
Wada et al.

(10) Patent No.: US 8,412,765 B2
(45) Date of Patent: Apr. 2, 2013

(54) COMMUNICATION DEVICE CONTROL PROGRAM, COMMUNICATION DEVICE AND COMMUNICATION DEVICE CONTROL METHOD

(75) Inventors: Yuji Wada, Kawasaki (JP); Takao Mohri, Kawasaki (JP); Hideki Mitsunobu, Kawasaki (JP); Satoru Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 12/017,823

(22) Filed: Jan. 22, 2008

(65) Prior Publication Data

US 2008/0177820 A1 Jul. 24, 2008

(30) Foreign Application Priority Data

Jan. 24, 2007 (JP) ................................. 2007-013626

(51) Int. Cl.
*G06F 15/16* (2006.01)
(52) U.S. Cl. ........................................ 709/201; 709/224
(58) Field of Classification Search .......... 709/223–224, 709/227–228, 201, 205
See application file for complete search history.

(56) References Cited

U.S. PATENT DOCUMENTS

| | | | | |
|---|---|---|---|---|
| 6,643,289 B1 * | 11/2003 | Natanson et al. | .......... | 370/395.2 |
| 2001/0005858 A1 * | 6/2001 | Ohno et al. | .................. | 709/223 |
| 2004/0085900 A1 * | 5/2004 | Nishio | .......................... | 370/230 |
| 2004/0249923 A1 * | 12/2004 | Ko et al. | ....................... | 709/223 |
| 2005/0198227 A1 * | 9/2005 | Nakama | ........................ | 709/220 |
| 2006/0056426 A1 * | 3/2006 | Wakameda et al. | ........... | 370/401 |
| 2006/0227864 A1 * | 10/2006 | Miyamoto et al. | ....... | 375/240.01 |
| 2007/0124447 A1 * | 5/2007 | Ajitomi et al. | ................ | 709/223 |
| 2008/0014937 A1 * | 1/2008 | Laroia et al. | .............. | 455/435.1 |
| 2008/0101373 A1 * | 5/2008 | Nishio | ....................... | 370/395.2 |
| 2009/0177896 A1 * | 7/2009 | Ito et al. | ........................ | 713/300 |
| 2009/0287812 A1 * | 11/2009 | Weber et al. | .................. | 709/224 |

FOREIGN PATENT DOCUMENTS

| | | |
|---|---|---|
| JP | 2006-005476 | 1/2006 |
| JP | 2006-67507 | 3/2006 |
| JP | 2006-122230 | 5/2006 |
| JP | 2006-127230 | 5/2006 |

OTHER PUBLICATIONS

Japanese Office Action mailed Jan. 17, 2012 issued in corresponding Japanese Patent Application No. 2007-013626.

* cited by examiner

*Primary Examiner* — Abdullahi Salad
(74) *Attorney, Agent, or Firm* — Staas & Halsey LLP (57) ABSTRACT

A communication device and method is disclosed for indicating a connection to a network and transmitting a living notification having a term of validity to the network when the device is connected with the network. The disclosed device includes an obtaining unit obtaining a first information representing a device status of the communication device, a determining unit determining a term of validity based on the first information obtained, and a first transmission unit transmitting a living notification having the term of validity determined to the network.

16 Claims, 11 Drawing Sheets

ADJUSTMENT REFERENCE INFORMATION ((RADIO FIELD INTENSITY),
 ((ONE MINUTE, RADIO FIELD INTENSITY ≥ 60),
  (30 SECONDS, RADIO FIELD INTENSITY ≥ 40),
  (15 SECONDS, RADIO FIELD INTENSITY ≥ 20),
  (5 SECONDS, RADIO FIELD INTENSITY ≥ 10),
  (ONE SECOND, RADIO FIELD INTENSITY < 10)))

ADJUSTMENT REFERENCE INFORMATION ((RESIDUAL POWER CAPACITY, TERMINAL MOVING SPEED),
((ONE MINUTE, RESIDUAL POWER CAPACITY ≥ 50%
and MOVING SPEED ≤ 60km/h),
(15 SECONDS, RESIDUAL POWER CAPACITY ≥ 30%
or MOVING SPEED ≤ 80km/h),
(ONE SECOND, RESIDUAL POWER CAPACITY < 30%
or MOVING SPEED > 80km/h)))

COMMUNICATION DEVICE CONTROL PROGRAM, COMMUNICATION DEVICE AND COMMUNICATION DEVICE CONTROL METHOD

CROSS-REFERENCE TO RELATED APPLICATIONS

This application is related to and claims the benefit of priority from the prior Japanese Patent Application No. 2007-013626, filed on Jan. 24, 2007, the entire contents of which are incorporated herein by reference.

BACKGROUND

1. Field

The present invention relates to a communication device control program, a communication device and a communication device control method of indicating a connection with a network and transmitting a living notification having a term of validity (expiration of term) to the network when the device is connected with the network.

2. Description of the Related Art

According to the typical ubiquitous environment, a mechanism cooperating with a service or an equipment existing at that a site is required. At present, attention is paid to UPnP (Universal Plug and Play) as a standard technique for the cooperation concerned.

SUMMARY

The disclosed device and method relates to the control of a communication device for indicating the connection to a network and also transmitting a living notification having a term of validity to the network when the device is connected with the network, the control including obtaining a first information representing a status of the communication device, determining the term of validity based on the first information obtained, and transmitting a living notification having the term of validity determined to the network.

Additional aspects and/or advantages will be set forth in part in the description which follows and, in part, will be apparent from the description, or may be learned by practice of the invention.

The disclosed communication device indicates a connection to a network and transmits a living notification having a term of validity to the network when the device is connected with the network. The device includes an obtaining unit obtaining a first information representing a device status of the communication device, a determining unit determining a term of validity based on the first information obtained and a first transmission unit transmitting a living notification having the term of validity determined to the network.

BRIEF DESCRIPTION OF THE DRAWINGS

These and/or other aspects and advantages will become apparent and more readily appreciated from the following description of the embodiments taken in conjunction with the accompanying drawings of which.

DETAILED DESCRIPTION OF THE PREFERRED EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

First, a living notification (ALIVE) of a Universal Plug and Play (UPnP) device will be described. Hereinafter, a UPnP device to be targeted will be referred to as a target UPnP device, and a network with which the target UPnP device is connected will be referred to as a target network. When the target UPnP device is being connected with the target network, the target UPnP device transmits a living notification to the target network including in a multicast style in order to notify existence of the UPnP device to other UPnP devices in the target network. A term of validity is attached to the living notification. Furthermore, the target UPnP device may transmit a living notification again before the term of validity expires. The other UPnP devices receiving the living notification regard the target UPnP device as existing or available within the term of validity and regard the target UPnP device as not existing or unavailable beyond the term of validity.

Next, a stop notification (BYEBYE) of the UPnP device will be described. The target UPnP device transmits a stop notification to the target network including in a multicast style when the target UPnP device secedes from the target network. The other UPnP devices receiving the stop notification regard the target UPnP device as not existing or unavailable even when the term of validity does not expire.

A typical technique involves a communication device for lengthening a term of validity under sleeping and returning the term of validity to an original term of validity after sleeping in order to prevent the term of validity from expiring under sleeping (for example, JP-A-2006-122230). Furthermore, a communication device has been discussed for confirming reception of a living notification from a target device at a shorter interval than the term of validity of the living notification and confirming existence of the target equipment when the reception is not confirmed (for example, JP-A-2006-5476).

However, the existence/stop notification of UPnP is not interlocked with a connection/secession of a network, and thus when the target UPnP device secedes from the target network without transmitting any stop notification, the other UPnP devices regard the target UPnP device as existing in the target network until a term of validity expires. For example, when the target UPnP device connected with the network through a wireless communication goes out of a wireless communication area, the device secedes from the network without transmitting any stop notification. Furthermore, a normal term of validity is generally set to 30 minutes, and in this case, the other UPnP devices regard the target UPnP device as existing for 30 minutes at a maximum.

In an embodiment, a wireless UPnP device in which a communication device of the disclosed invention is applied to an information processing device based on UPnP will be described.

Figure 1:
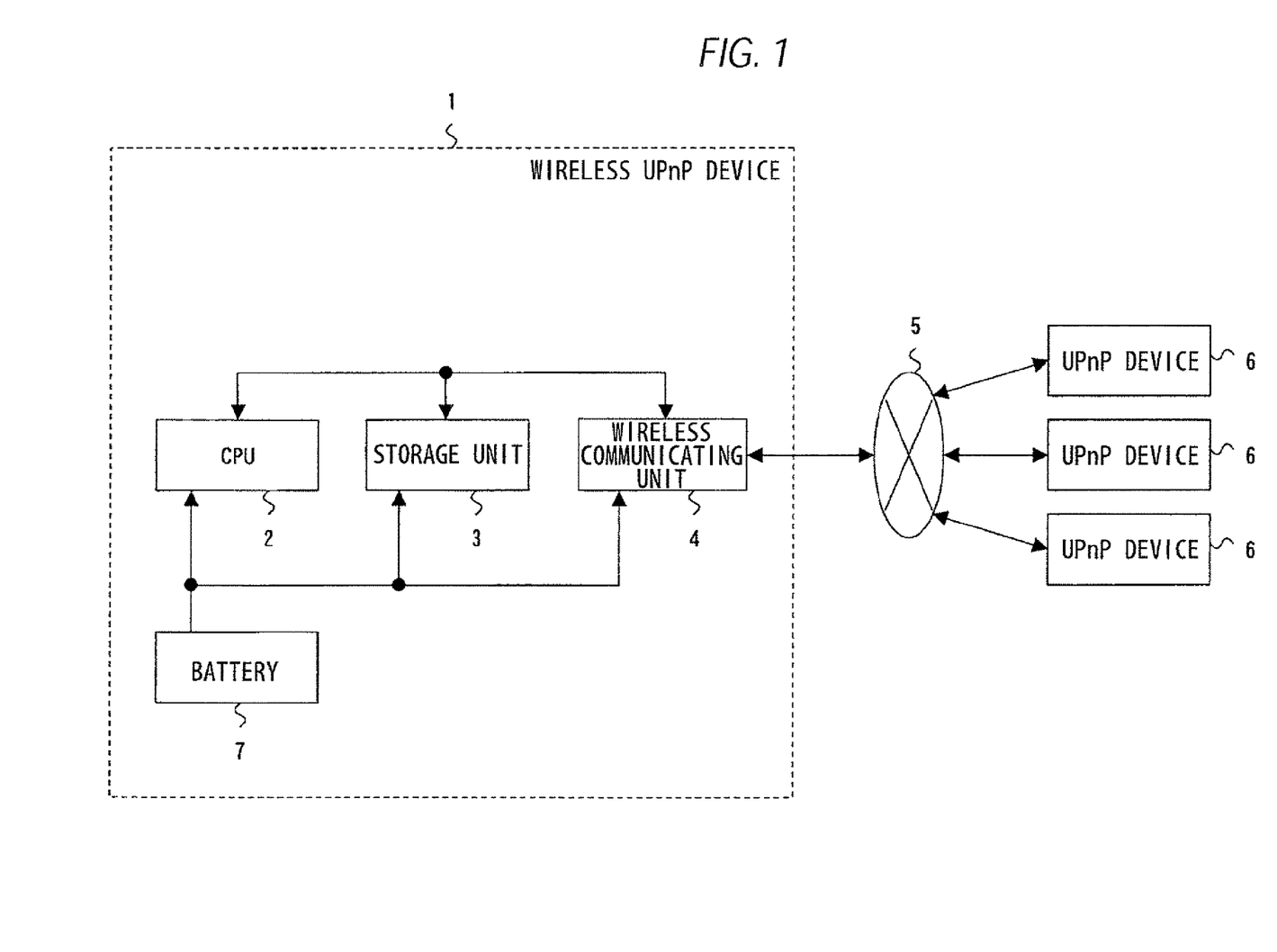
FIG. 1 is a block diagram illustrating an example of hardware construction of a wireless Universal Plug and Play (UPnP) device according to an embodiment.

FIG. 1 is a block diagram showing an example of the hardware construction of a wireless UPnP device. As shown in FIG. 1, the hardware of a wireless UPnP device 1 is equipped with a CPU 2, a storage unit 3, a wireless communication unit 4 and a battery 7. The wireless UPnP device 1 can be connected with a target network 5 using the wireless communication unit 4, and can communicate with a UPnP device(s) 6 which is based on UPnP and connected with the target network 5. The storage unit 3 is implemented by a memory, or the like that is capable of storing data. The battery 7 supplies power to CPU 2, the storage unit 3 and the wireless communication unit 4. The UPnP device(s) 6 illustrated in FIG. 1 may be any existing devices that implement existing protocols pertaining to Universal Plug and Play operations.

Figure 2:
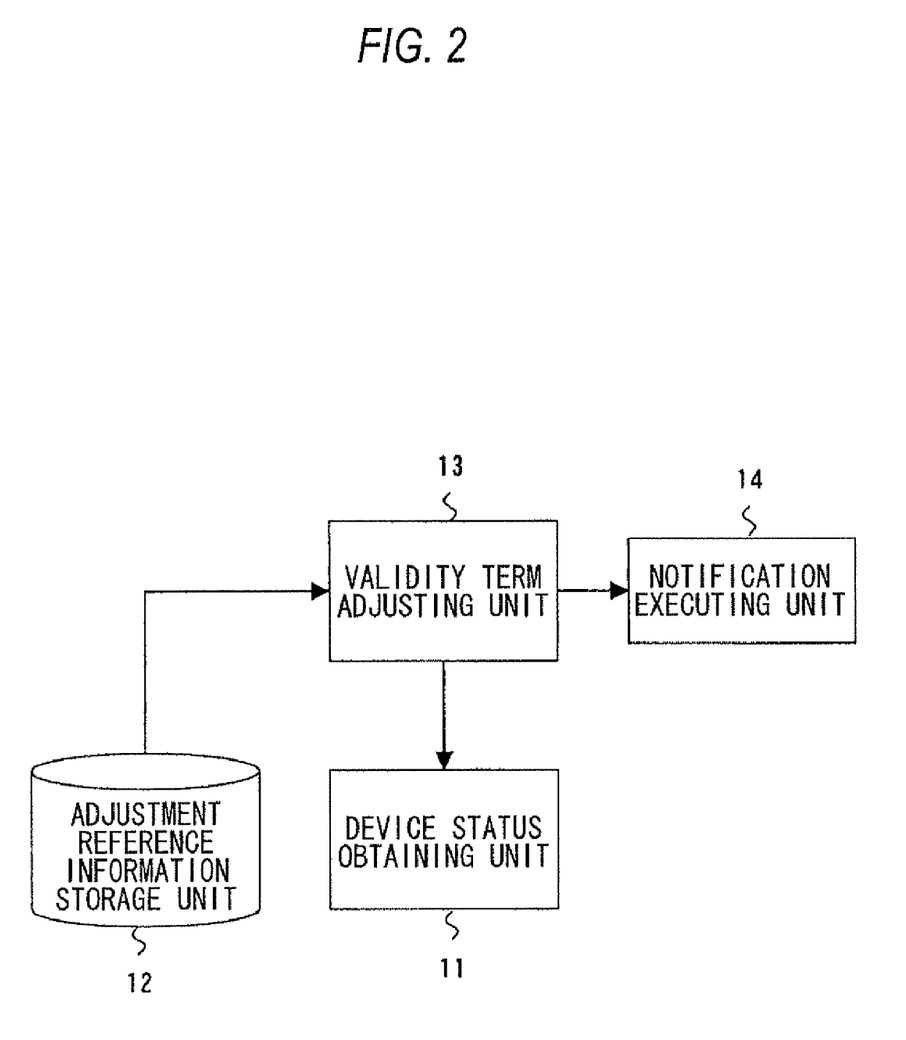
FIG. 2 is a block diagram illustrating an example of construction of a wireless UPnP device according to an embodiment.

FIG. 2 is a block diagram showing an example of the construction of a wireless UPnP device. The construction shown in FIG. 2 may be implemented via software. The implementation of the wireless UPnP device 1 is equipped with a device status obtaining unit 11, an adjustment reference information storage unit 12, a validity term adjusting unit 13 and a notification executing unit 14. Operations of the device status obtaining unit 11, the validity term adjusting unit 13 and the notification executing unit 14 may be implemented by executing programs stored in a storage unit (not shown) in CPU 2 (FIG. 1). The adjustment reference information storage unit 12 is implemented by the storage unit 3.

The device status obtaining unit 11 obtains a device status (first information) representing a present status of the wireless UPnP device 1. In an embodiment, the device status is set to an intensity of electrical waves. The electrical wave intensity corresponds to the intensity of electrical waves received (or transmitted) by the wireless UPnP device 1 in a wireless communication with a target network. The device status obtaining unit 11 obtains the electrical wave intensity from the wireless communication unit 4.

The device status includes a communication band, a residual power capacitance, a moving speed, a load, etc., for example. The communication band includes a bandwidth transmitted/received by the wireless UPnP device 1 in a wireless communication with the target network. The residual power capacity includes a residual amount of a driving capability of the battery, for example, battery 7 (FIG. 1), when the wireless UPnP device 1 is driven by the battery. When the wireless UPnP device 1 and a position detecting device such as a GPS (Global Positioning Systems) receiver, an acceleration sensor, or the like is mounted in a vehicle or the like, a moving speed is a moving speed output from a position information detecting device. The load is a usage rate of CPU 2 in the wireless UPnP device 1, the use amount of the storage unit 3 or the like. The device status may be a value obtained by calculating plural device statuses described above.

The adjustment reference information storage unit 12 stores adjusting reference information. The adjusting reference information includes information serving as a reference to adjust the term of validity, and may comprise a condition of a device status and a value of the validity term when the device status satisfies the condition. The device status and the adjusting reference information are assumed to be represented by the electrical wave intensity, the residual power capacity and the terminal moving speed.

Figure 3:
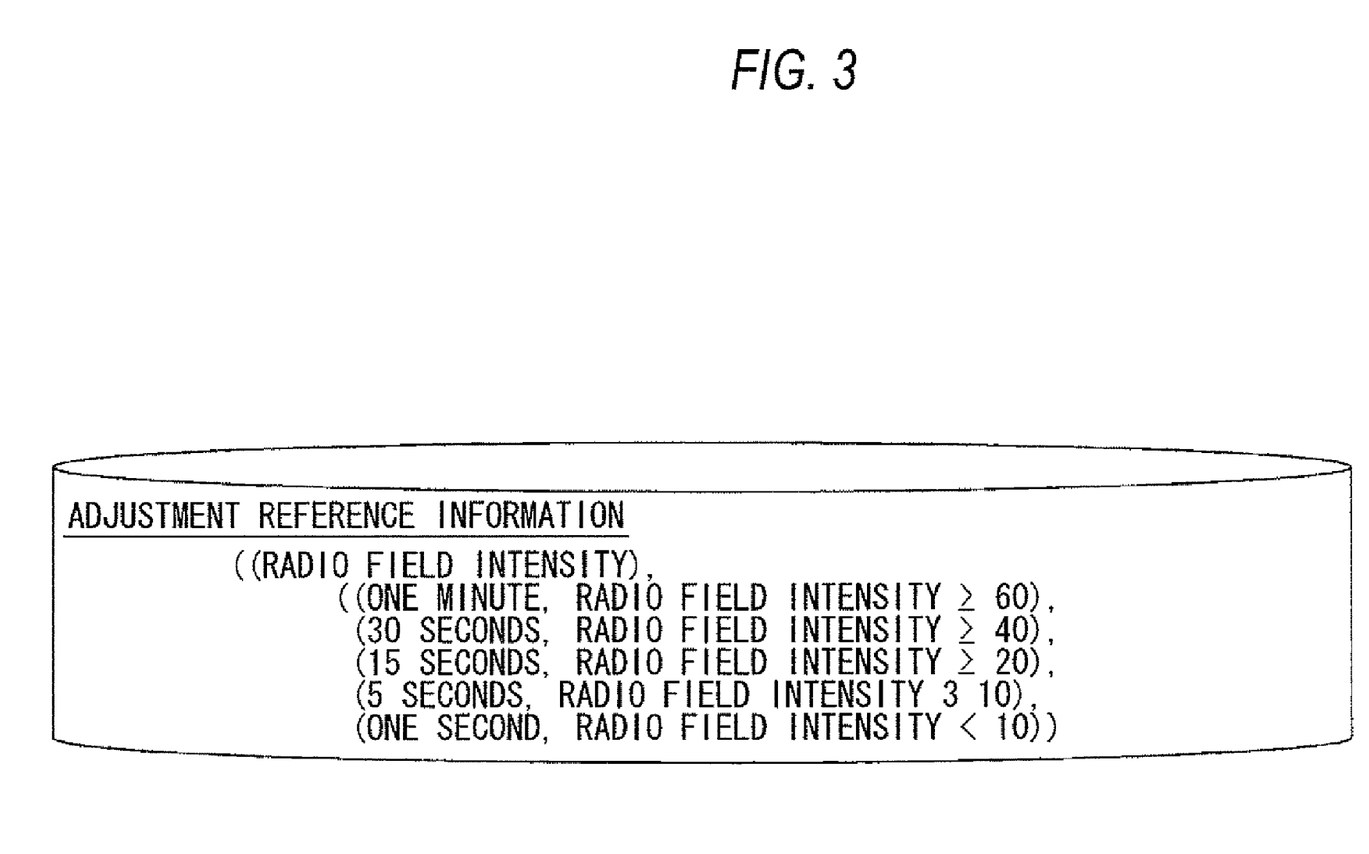
FIG. 3 is a diagram illustrating an example of adjusting reference information according to an embodiment.

FIG. 3 is a diagram showing an example of adjusting reference information. The adjusting reference information may comprise a pair of information (such as a value of a validity term, a condition of a device status). The condition of the device status in an embodiment is a range of the value of the electrical wave intensity.

With respect to the adjusting reference information, a user of the wireless UPnP device 1 can easily change the adjusting reference information by storing the value of the validity term and the condition of the device status.

The validity term adjusting unit 13 adjusts the validity term on the basis of the device status from the device status obtaining unit 11 and the adjusting reference information from the adjustment reference information storage unit 12, and instructs the notification executing unit 14.

The notification executing unit 14 transmits a living notification and a stop notification based on UPnP from the wireless communication unit 4 to the target network 5 including in a multicast style.

When receiving the living notification from the wireless UPnP device 1 or another UPnP device(s) 6 according to the standard of UPnP, the UPnP device(s) 6 renews the held validity term of the device at a transmission source to a validity term contained in the received living notification. Operations of the wireless UPnP device 1 are described below in detail.

Figure 4:
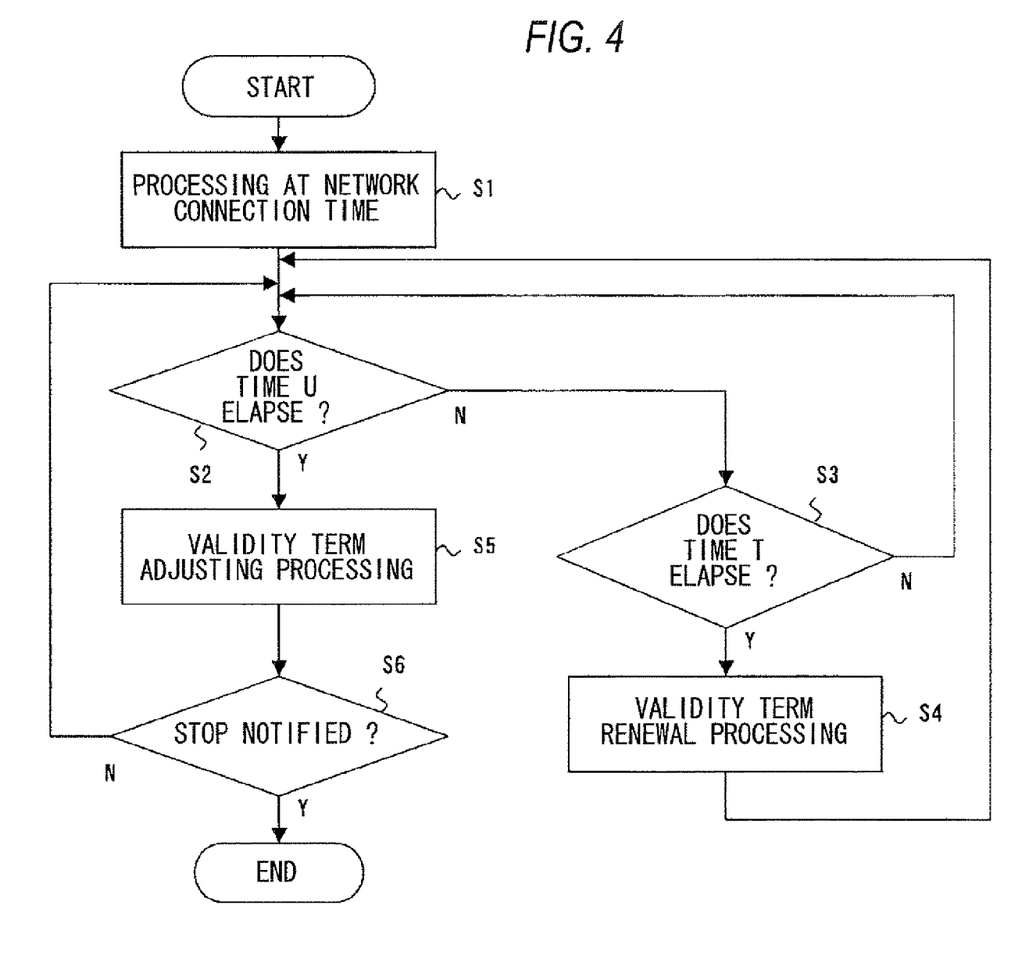
FIG. 4 is s a flowchart illustrating an example of operation(s) of a wireless UPnP device according to an embodiment.

FIG. 4 is a flowchart showing an example of an operation of a wireless UPnP device. This flow shows the operation executed during a period when the wireless UPnP device 1 is connected with the target network 5. First, when the wireless UPnP device 1 is connected with the target network 5, the validity term adjusting unit 13 executes a processing at a network connection time (S1). For example, the validity term adjusting unit 13 starts a validity term timer for counting a validity term T and a device status timer for counting a device status obtaining interval U. Subsequently, the validity term adjusting unit 13 judges on the basis of the device status timer whether the time U elapses (S2).

When the time U does not elapse in the processing S2 (S2, No), the validity term adjusting unit 13 judges on the basis of the validity term timer whether the time T elapses or not (S3). When determining that the time T does not elapse (S3, No), the processing returns to the processing S2. When determining that the time T elapses (S3, Yes), the validity term adjusting unit 13 executes a validity term renewal processing (S4), and then returns to the processing S2.

When determining that the time U elapses in the processing S2 (S2, Yes), the validity term adjusting unit 13 executes a validity term adjusting processing (S5), and judges whether a stop notification is carried out through the validity term adjusting processing (S6). When determining that the stop notification is not carried out (S6, No), it returns to the processing S2. When determining that the stop notification is carried out (S6, Yes), this flow is finished. When the wireless UPnP device is connected with the network, the wireless UPnP device starts this flow again.

The processing at the network connection time will be described below in detail.

Figure 5:
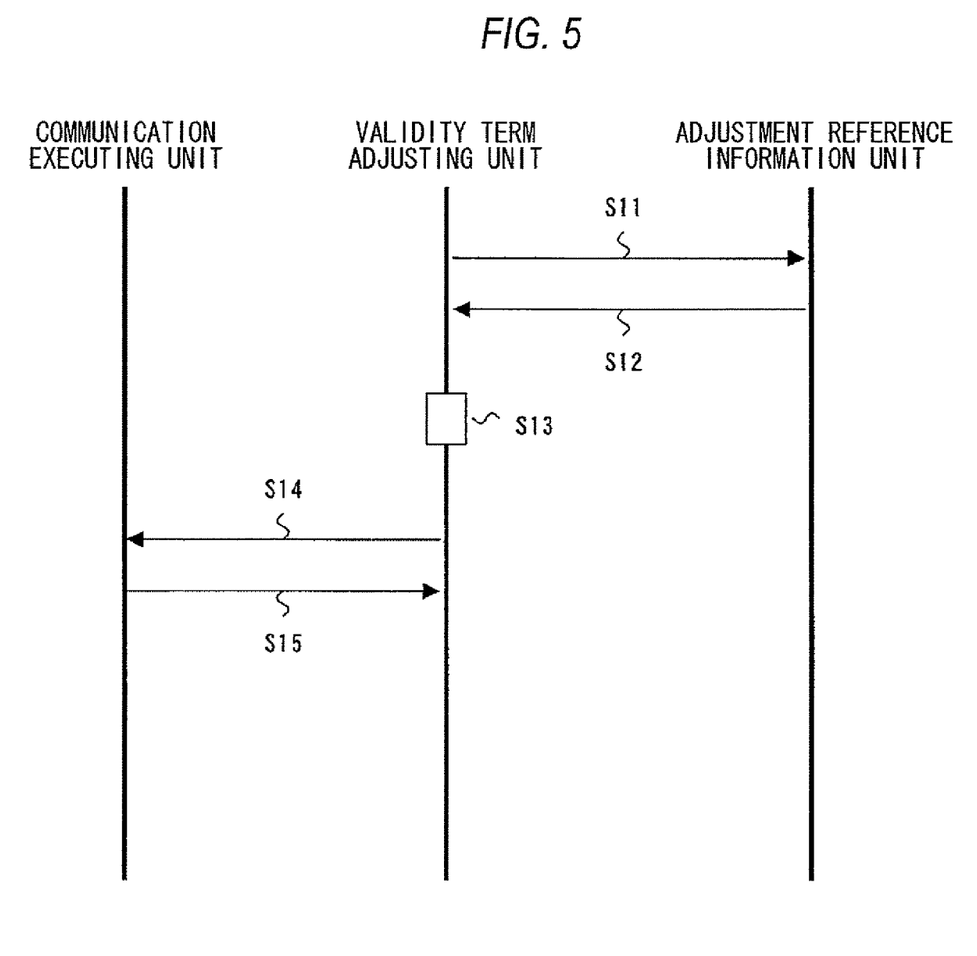
FIG. 5 is a sequence diagram illustrating an example of operation(s) of a processing at a network connection time according to an embodiment.

FIG. 5 is a sequence diagram showing an example of an operation of a processing at a network connection time. This sequence diagram shows operation(s) of the notification (communication) executing unit 14, the validity term adjusting unit 13 and the adjustment reference information storage unit 12 described in FIG. 2. First, when the wireless UPnP device 1 is connected with the target network 5, the validity term adjusting unit 13 requests adjusting reference information from the adjustment reference information storage unit 12 (S11). The adjustment reference information storage unit 12 receiving this request outputs the adjusting reference information to the validity term adjusting unit 13 (S12). Subsequently, the validity term adjusting unit 13 sets a value of a shortest validity term among the adjusting reference information as a present validity term T (S13). Subsequently, the validity term adjusting unit 13 instructs the notification executing unit 14 to transmit a living notification containing the validity term T (S14). The notification (communication) executing unit 14 transmits the living notification and returns a transmission result as a response to the validity term adjusting unit 13 (S15), thereby finishing this sequence.

According to the above processing at the network connection time, the validity term of the wireless UPnP device 1 is first set to a short value, whereby the UPnP device(s) 6 in the target network 5 can rapidly recognize secession of the wireless UPnP device 1 when the wireless UPnP device 1 is connected with the target network 5 and immediately secedes from the target network 5 under unstable wireless communication.

Furthermore, after the processing S15, the validity term adjusting unit 13 starts the validity term timer for counting the validity term T, and starts the device status timer for counting the device status obtaining interval U which is the interval of obtaining the device status. The device status obtaining interval U may be set to a fixed value of the validity term T or less in advance, or changed on the basis of the validity term T. A validity term renewal processing will be described below in detail.

Figure 6:
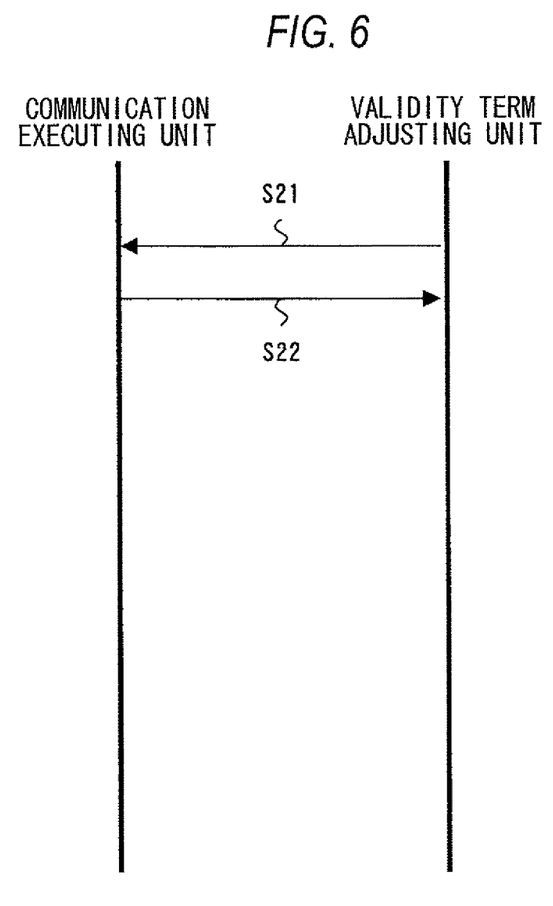
FIG. 6 is a sequence diagram illustrating an example of operation(s) of a validity term renewal processing according to an embodiment.

FIG. 6 is a sequence diagram showing an example of an operation of a validity term renewal processing. This sequence diagram shows the operation of the notification executing unit 14 and the validity term adjusting unit 13 shown in FIG. 2. When a validity term timer indicates lapse of the validity term T, the validity term adjusting unit 13 instructs the notification (communication) executing unit 14 to transmit a living notification containing the validity term T (S21). The notification (communication) executing unit 14 receiving the instruction transmits the living notification and returns a transmission result to the validity term adjusting unit 13 (S22), thereby finishing this sequence.

According to the validity term renewal processing described above, the wireless UPnP device 1 can notify a next validity term to the UPnP device(s) 6 when the validity term expires as in the case of the typical UPnP device.

Next, the validity term adjusting processing will be described below in detail.

Figure 7:
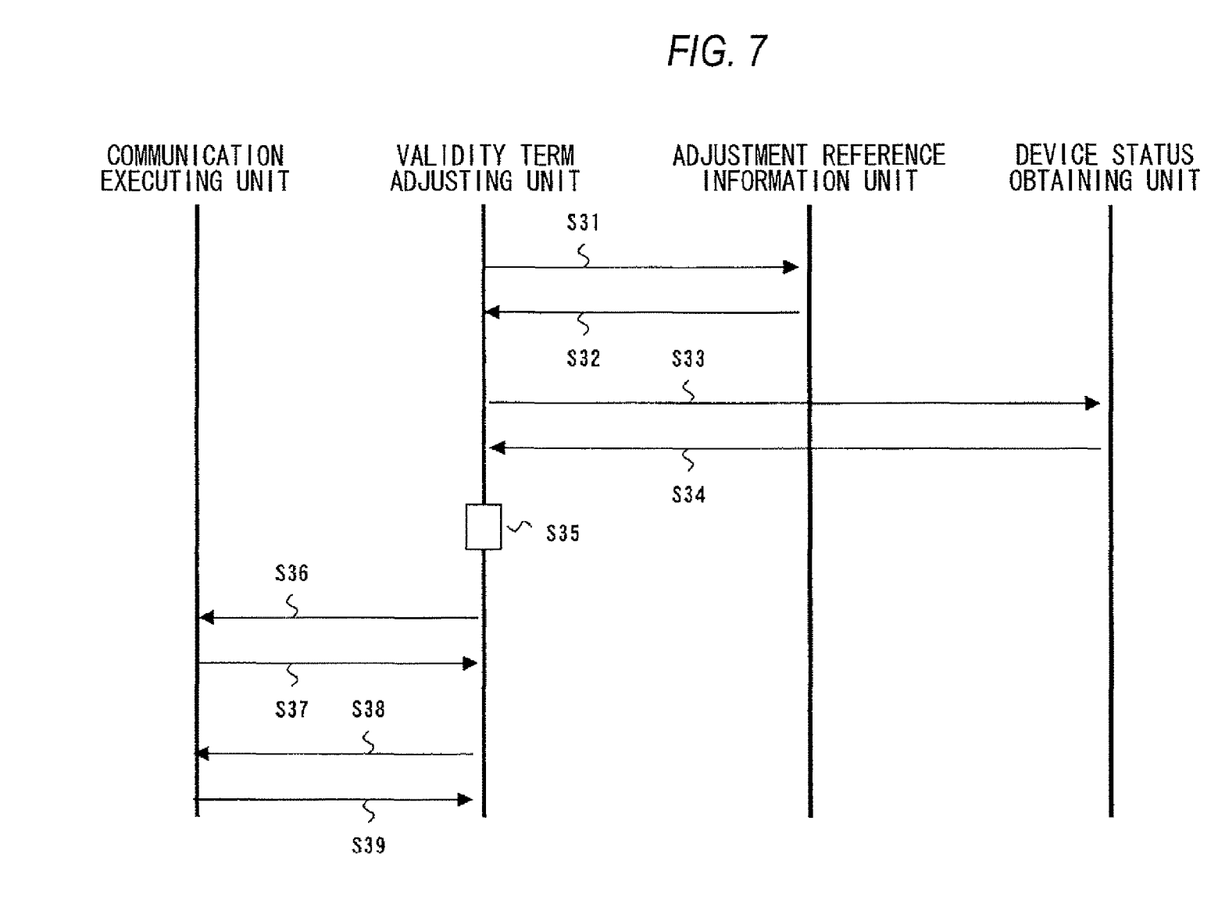
FIG. 7 is a sequence diagram illustrating an example of operation(s) of the validity term renewal processing according to an embodiment.

FIG. 7 is a sequence diagram showing an example of an operation of a validity term adjusting processing. This sequence diagram shows the operation of the notification (communication) executing unit 14, the validity term adjusting unit 13, the adjustment reference information storage unit 12 and the device status obtaining unit 11. When the device status timer indicates a lapse of the device status obtaining interval U, the validity term adjusting unit 13 requests adjusting reference information from the adjustment reference information storage unit 12 (S31). The adjustment reference information storage unit 12 receiving such a request outputs the adjusting reference information to the validity term adjusting unit 13 (S32). Subsequently, the validity term adjusting unit 13 requests a device status to the device status obtaining unit 11 (S33). The device status obtaining unit 11 receiving the request outputs the device status to the validity term adjusting unit 13 (S34). Subsequently, the validity term adjusting unit 13 stores a present validity term as T', and determines a new validity term T on the basis of the adjusting reference information and the device status (S35). Here, the validity term adjusting unit 13 adopts a smallest validity term beyond the validity terms satisfying the corresponding condition in the adjusting reference information.

When the value of T is equal to the value of T', the validity term adjusting unit 13 judges or determines that the validity term is not changed, and finishes this sequence.

When the value of T is different from the value of T' and the value of T is equal to zero, the validity term adjusting unit 13 judges that the device concerned secedes from the target network 5, and instructs the notification executing unit 14 to transmit a stop notification (S35). The notification (communication) executing unit 14 receiving the instruction transmits the stop notification, and returns a transmission result as a response to the validity term adjusting unit 13 (S37), thereby finishing this sequence.

When the value of T is different from the value of T' and the value of T is not equal to zero, the validity term adjusting unit 13 judges that it is required to notify a new validity term, and instructs the notification executing unit 14 to transmit a living notification containing a new validity term (S38). The notification (communication) executing unit 14 receiving this instruction transmits the living notification and returns a transmission result as a response to the validity term adjusting unit 13 (539), thereby finishing the sequence.

According to the validity term adjusting processing described above, the validity term can be dynamically determined on the basis of the adjusting reference information and the device status, and notified to the UPnP device(s) 6. Furthermore, when the device status indicates such a situation that the device secedes from the target network 5, the stop notification can be immediately notified to the UPnP device(s) 6.

Furthermore, the adjusting reference information may be installed in the validity term adjusting unit 13 as a code for setting the validity term by branching the condition of the device status, or may be installed in the validity term adjusting unit 13 as a relational expression between the device status and the validity term and the device status may be substituted into the relational expression to calculate the validity term. In this case, the wireless UPnP device 1 does not require the adjustment reference information storage unit 12.

Figure 8:
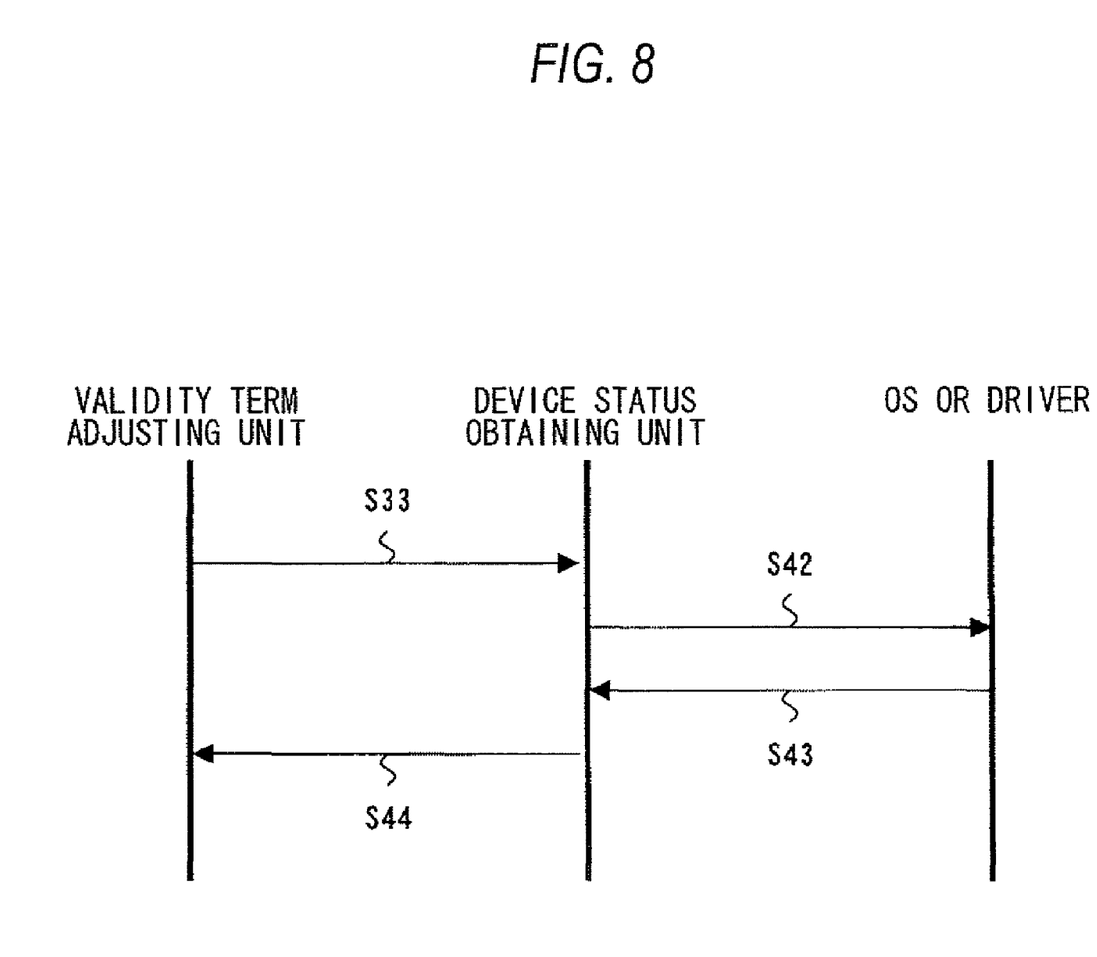
FIG. 8 is a sequence diagram illustrating an example of operation(s) of an equipment status obtaining processing according to an embodiment.

Next, the device status obtaining processing of obtaining the device status by the wireless UPnP device 1 in the processing S33 will be described in detail.

FIG. 8 is a sequence diagram showing an example of an operation of a device status obtaining processing. This sequence diagram shows the operation of the validity term adjusting unit 13, the device status obtaining unit 11, an OS or a driver of the wireless UPnP device 1. First, the validity term adjusting unit 13 requests the device status from the device status obtaining unit 11 (S33). This request may contain a type of the device status to be required. In an embodiment, the type of the device status is an intensity of electrical waves. The device status obtaining unit 11 receiving the request from the validity term adjusting unit 13 requests necessary information from the OS or the driver (S42). In an embodiment, the device status obtaining unit 11 requests the intensity of electrical waves held by the OS or the driver of the wireless communication unit 4 (FIG. 1). The OS or the driver receiving the request from the device status obtaining unit 11 outputs the requested information as a response to the device status obtaining unit 11 (S43). The device status obtaining unit 11 receiving the response outputs the requested device status as a response to the validity term adjusting unit 13 (S44), thereby finishing this sequence.

According to the device status obtaining processing described above, the status of each unit of the wireless UPnP device can be obtained from the OS or the driver.

Next, the communication executing processing corresponding to the processing of transmitting a notification from the wireless UPnP device 1 in the processing S36, S38 will be described in detail.

Figure 9:
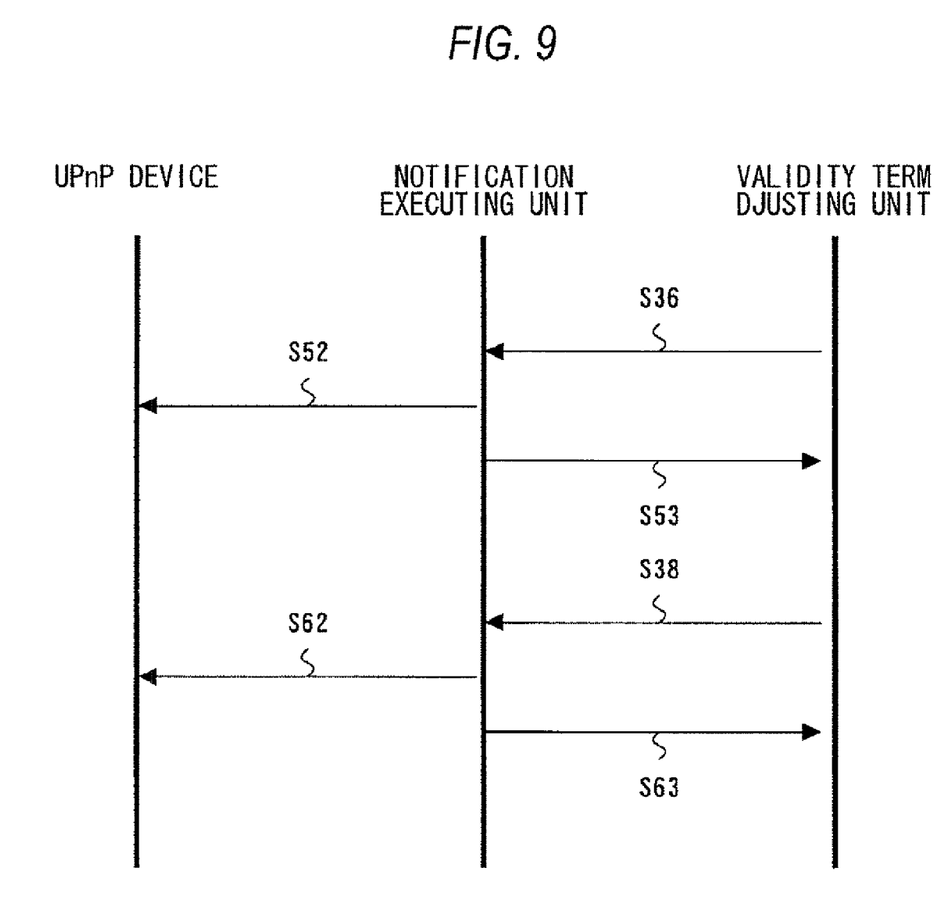
FIG. 9 is a sequence diagram illustrating an example of operation(s) of a communication executing processing according to an embodiment.

FIG. 9 is a sequence diagram showing an example of an operation of a communication executing processing. This sequence diagram shows the operation of the UPnP device(s) 6, the notification executing unit 14 and the validity term adjusting unit 13. When the validity term adjusting unit 13 instructs the notification executing unit 14 to transmit a stop notification (S36), the notification executing unit 14 receiving the instruction transmits the stop notification based on UPnP to the UPnP device(s) 6 by using the wireless communication unit 4 shown in FIG. 1 (S52), and returns a transmission result as a response to the validity term adjusting unit 13 (S53), thereby finishing this sequence. Furthermore, when the validity term adjusting unit 13 instructs the notification executing unit 14 to transmit a living notification containing the validity term T (S38), the notification executing unit 14 receiving the instruction transmits the living notification based on UPnP to the UPnP device(s) 6 by using the wireless communication unit 4 (S62), and returns a transmission result as a response to the validity term adjusting unit 13 (S63), thereby finishing this sequence.

According to the communication executing processing described above, the wireless UPnP device 1 can transmit the notification based on UPnP to the UPnP device(s) 6. Accordingly, the processing of UPnP can be performed without changing the target network 5 to which UPnP device(s) 6 including the conventional UPnP device(s) is connected.

According to an embodiment, as the intensity of electrical waves which the wireless UPnP device 1 receives from the target network 5 is stronger, it can be judged that the communication of the wireless UPnP device 1 is more stabilized. Furthermore, the UPnP device(s) 6 can rapidly recognize sudden secession of the wireless UPnP device 1 by setting the validity term to a long value when it is judged that the communication of the wireless UPnP device 1 is stable and also setting the validity term to a short value when it is judged that the communication of the wireless UPnP device 1 is not stable.

Furthermore, when the intensity of electrical waves received from the target network 5 by the wireless UPnP device 1 is weaker than a predetermined value, it can be judged that the function of UPnP cannot be kept. Furthermore, by transmitting a stop notification when it is judged that the wireless UPnP device 1 cannot keep the function of UPnP, the UPnP device(s) 6 can be prevented from recognizing that the wireless UPnP device 1 is being connected to the target network although the wireless UPnP device 1 actually secedes from the target network.

In an embodiment, a wireless UPnP device which is similar to that of FIG. 1 sets a validity term on the basis of the residual power capacity and a terminal moving speed.

First, the construction of the wireless UPnP device according to this embodiment will be described below in detail.

Figure 10:
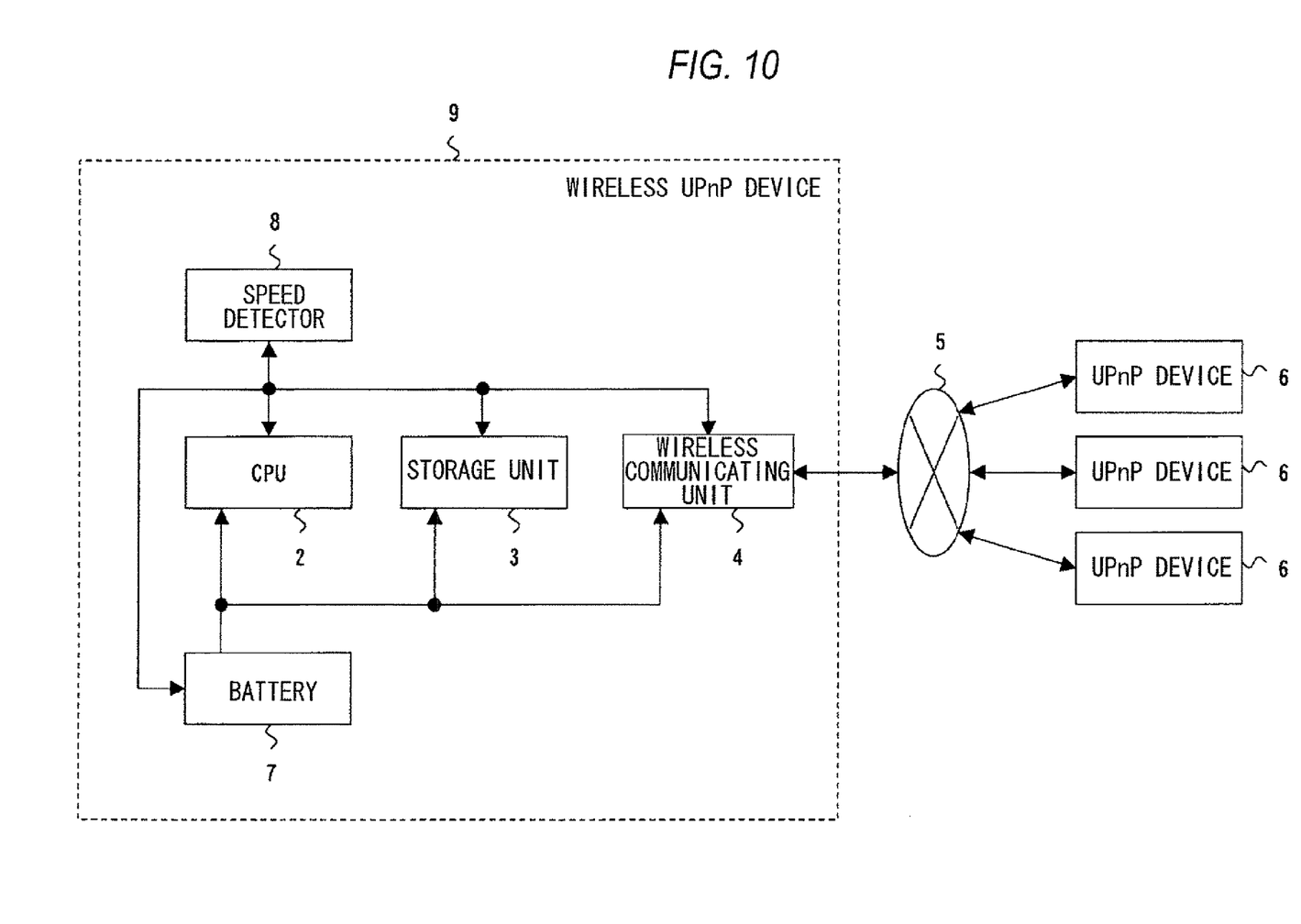
FIG. 10 is a block diagram illustrating an example of hardware construction of a wireless UPnP device according to an embodiment.

FIG. 10 is a block diagram showing an example of a hardware construction of a wireless UPnP device. In FIG. 10, the same reference numerals represent the same elements as shown in FIG. 1 or corresponding elements, and the description thereof is omitted. As compared with FIG. 1, a wireless UPnP device 9 is provided in place of the wireless UPnP device 1. As compared with the wireless UPnP device 1, the wireless UPnP device 9 is newly equipped with a speed detector 8. The speed detector 8 detects the moving speed of the wireless UPnP, and may comprise a GPS receiver or an acceleration sensor. The battery 7 supplies power to the CPU 2, the storage unit 3, the wireless communication unit 4 and the speed detector 8. The software construction of the wireless UPnP device 9 according to an embodiment is the same as the wireless UPnP device 1.

In this embodiment, the device status is the residual power capacity and the moving speed. The device status obtaining unit 11 obtains the residual power capacity from the battery 7 and also obtains the terminal moving speed from the speed detector 8.

Next, the adjustment reference information will be described below in detail.

Figure 11:
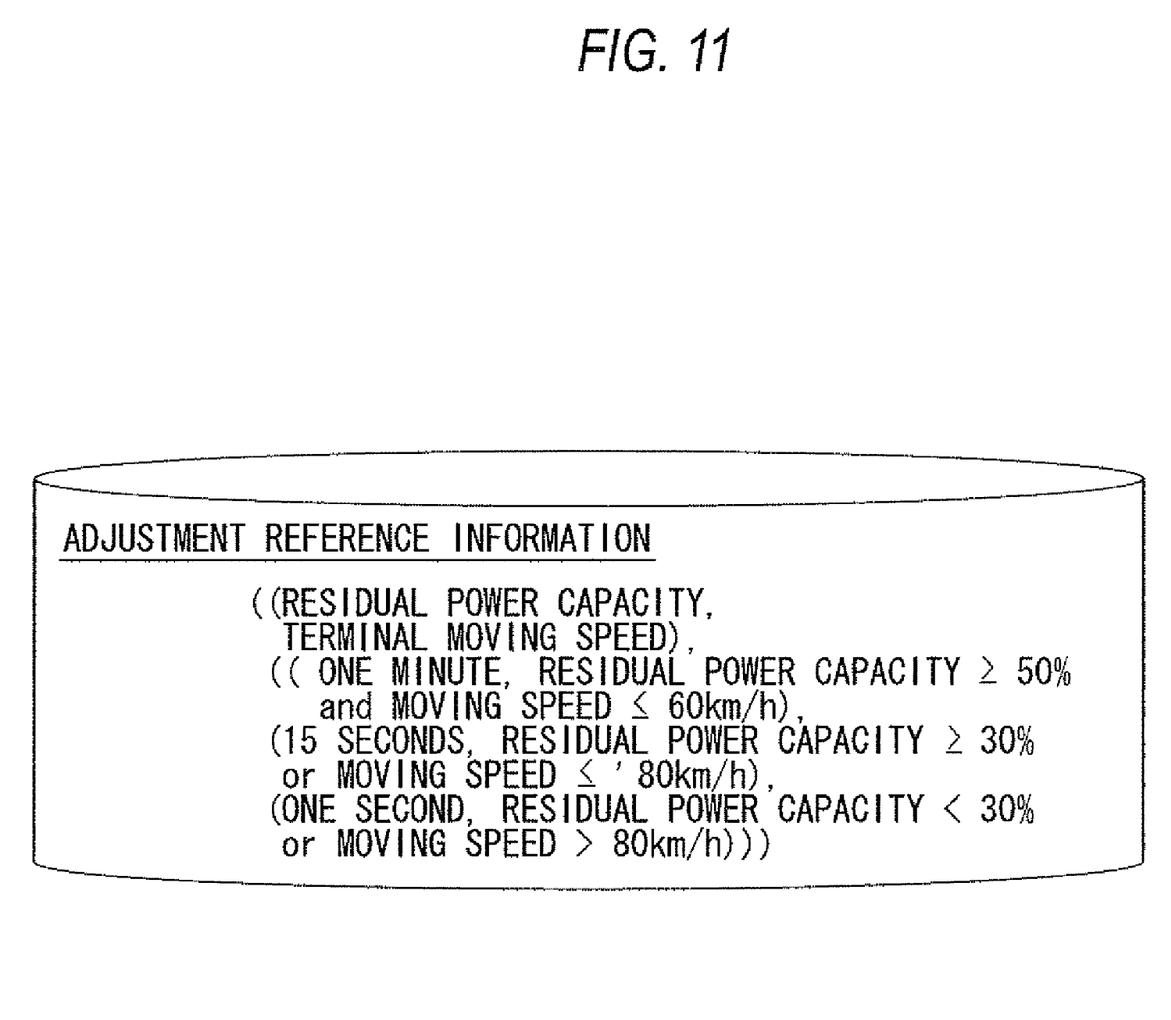
FIG. 11 is a diagram illustrating an example of adjusting reference information according to an embodiment.

FIG. 11 is a diagram showing an example of an adjusting reference information. The adjusting reference information may comprise a pair of a value of a validity term and a condition of the device status similar to the above description. The condition of the device status of an embodiment corresponds to AND operation or OR operation (logic operation) between a range of the value of the residual power capacity and the range of the value of the moving speed. The processing at the network connection time, the validity term renewal processing, the validity term adjusting processing and the communication executing processing of this embodiment are the same as the first embodiment.

The device status obtaining processing according to this embodiment is the same as the first embodiment. However, in the processing S42, the device status obtaining unit 11 requests the electrical wave intensity held in OS or the driver of the battery 7 and the moving speed held in OS or the driver of the speed detector 8.

According to an embodiment, the wireless UPnP device 9 adjusts the validity term on the basis of the condition of the combination of plural kinds of device statuses and plural kinds of device statuses, whereby the wireless UPnP device 1 can set an accurate validity term in accordance with a complicated status.

An obtaining operation corresponds to the device status obtaining processing in this embodiment. A determining operation corresponds to the validity term adjusting processing in this embodiment. A first transmission operation and a second transmission operation correspond to the notification executing processing in this embodiment.

Furthermore, an obtaining unit corresponds to the device status obtaining unit in this embodiment. A determining unit corresponds to the validity term adjusting unit in this embodiment. A first transmission unit corresponds to the notification executing unit in this embodiment.

The communication device according to this embodiment can be easily applied to an information processing device, and the performance of the information processing device can be more enhanced. Here, the information processing device contains a cellular phone, PDA (Personal Digital Assistance), a notebook PC (Personal Computer), a car navigation system or the like.

Furthermore, a program for executing each operation described above in a computer constituting the communication device may be supplied as a communication device control program. The above program may be stored in a computer-readable recording medium, whereby the program can be executed by a computer constituting the communication device. Here, the computer-readable recording medium may contain an internal storage device mounted in a computer such as ROM, RAM or the like, a portable storage medium such as CD-ROM, a flexible disk, a DVD disk, a magnetooptical disk, an IC card or the like, a data base holding computer programs, another computer and the data base thereof, or a transmission medium on a line.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-readable non-transitory medium storing a program that causes a computer to execute operations, the computer being included in a communication device connectable to a network, said operations comprising:
    storing first validity terms in association with plural conditions for first device status information representing an operational state to be entered by the communication device, each of the first validity terms indicating a candidate for a second validity term that is to be attached to a living notification of the communication device and indicates a time period during which the living notification is valid, the living notification indicating whether the communication device is alive or not;
    obtaining second device status information indicating a current operational state of the communication device from the communication device;
    determining the first validity term associated with one of the plural conditions that is satisfied by the second device status information, to be the second validity term; and
    transmitting the living notification to which the determined second validity term is attached, to the network, and
    wherein a validity term that is minimum among the first validity terms is determined to be the second validity term when the communication device is connected to the network.

2. The computer-readable non-transitory medium according to claim 1, wherein the first device status information contains at least one of an intensity of electrical waves transmitted or received by the communication device, a bandwidth at which transmission or reception is performed between the communication device and the network, a residual amount of power of the communication device, a moving speed of the communication device and a load of the communication device.

3. The computer-readable non-transitory medium according to claim 1, wherein
    each of the plural conditions for the first device status information is represented by a range of a value of the first device status information.

4. The computer-readable non-transitory medium according to claim 1, wherein the plural conditions for the first device status information are represented by a logic operation of values of different types of the first device status information.

5. The computer-readable non-transitory medium according to claim 1, wherein the determining includes considering a relational expression representing a relationship between the first device status information and the first validity term and calculating the second validity term based on the second device status information and the relational expression.

6. The computer-readable non-transitory medium according to claim 1, wherein the living notification is based on UPnP.

7. The computer-readable non-transitory medium according to claim 1, comprising:
    transmitting to the network a stop notification indicating that the communication device secedes from the network when determination indicates that the second device status information satisfies a predetermined stop condition.

8. The computer-readable non-transitory medium according to claim 7, wherein the predetermined stop condition resides in that the determined second validity term expires.

9. The computer-readable non-transitory medium according to claim 7, wherein the stop notification is based on UPnP.

10. A communication device connectable to a network, the communication device comprising:
    a memory to store first validity terms in association with plural conditions for first device status information representing an operational state to be entered by the communication device, each of the first validity terms indicating a candidate for a second validity term that is to be attached to a living notification of the communication device and indicates a time period during which the living notification is valid, the living notification indicating whether the communication device is alive or not;
    a processor to:
        obtain second device status information indicating a current operational state of the communication device from the communication device;
        determine the first validity term associated with one of the plural conditions that is satisfied by the current device status information, to be the second validity term; and
        transmitting the living notification to which the determined second validity term is attached, to the network, and
    wherein a term that is minimum among the first validity terms is determined to be the second validity term when the communication device is connected to the network.

11. The communication device according to claim 10, wherein the first device status information contains at least one of an intensity of electrical waves transmitted or received by the communication device, a bandwidth at which transmission or reception is performed between the communication device and the network, a residual amount of power of the communication device, a moving speed of the communication device and a load of the communication device.

12. The communication device according to claim 10, wherein each of the plural conditions for the first device status information is represented by a range of a value of the first device status information.

13. The communication device according to claim 10, wherein the plural conditions for the first device status information are represented by a logic operation of values of different types of the first device status information.

14. The communication device according to claim 13, wherein the memory stores a relational expression representing a relationship between the first device status information and the first validity term and
    the processor calculates the second validity term based on the second device status information obtained and the relational expression.

15. The communication device according to claim 10, wherein when determining that the second device status information satisfies a predetermined stop condition, a stop notification indicating that the communication device secedes from the network is transmitted to the network.

16. A communication device control method carried out by a communication device connectable to a network, the communication device control method comprising:

storing first validity terms in association with plural conditions for first device status information representing an operational state to be entered by the communication device, each of the first validity terms indicating a candidate for a second validity term that is to be attached to a living notification of the communication device and indicates a time period during which the living notification is valid, the living notification indicating whether the communication device is alive or not;

obtaining second device status information indicating a current operational state of the communication device from the communication device;

determining the first validity term associated with one of the plural conditions that is satisfied by the second device status information, to be the second validity term; and transmitting the living notification to which the determined second validity term is attached, to the network, and wherein a term that is minimum among the first validity terms is determined to be the second validity term, when the communication device is connected to the network.

* * * * *